United States Patent
Jung

(10) Patent No.: US 6,955,108 B2
(45) Date of Patent: Oct. 18, 2005

(54) SAWING DEVICE FOR SHEETS OF WOOD, PLASTIC OR THE LIKE

(75) Inventor: Erhard Jung, Altenstadt (DE)

(73) Assignee: GreCon Dimter Holzoptimierung Süd GmbH & Co. KG, Illertissen (DE)

(*) Notice: Subject to any disclaimer, the term of this patent is extended or adjusted under 35 U.S.C. 154(b) by 0 days.

(21) Appl. No.: 10/095,300

(22) Filed: Mar. 8, 2002

(65) Prior Publication Data

US 2002/0157518 A1 Oct. 31, 2002

(30) Foreign Application Priority Data

Mar. 8, 2001 (DE) .......................... 101 11 326

(51) Int. Cl.[7] .............................. B26D 7/06; B26D 1/18
(52) U.S. Cl. ...................... 83/435.2; 83/424; 83/155; 83/488; 83/271; 83/953
(58) Field of Search ........................... 198/678.1, 688.1, 198/690.2, 699.1; 83/707, 155, 423, 424, 435.2, 466.1, 485, 486, 488, 489, 353, 202, 271, 56, 356.2, 875, 953, 941, 935, 467.1, 751, 483, 487, 614, 411.7

(56) References Cited

U.S. PATENT DOCUMENTS

| | | | | |
|---|---|---|---|---|
| 1,495,590 A | * | 5/1924 | Hogelucht | 83/118 |
| 1,532,538 A | * | 4/1925 | Langston | 83/302 |
| 1,796,369 A | * | 3/1931 | Hirst | 83/435.2 |
| 1,924,162 A | * | 8/1933 | Mason | 83/311 |
| 2,669,262 A | * | 2/1954 | Stevens | 83/255 |
| 2,925,165 A | * | 2/1960 | Rake | 198/690.2 |
| 3,086,571 A | * | 4/1963 | Cooper | 83/257 |
| 3,266,352 A | * | 8/1966 | Kuts | 83/18 |
| 3,415,150 A | * | 12/1968 | Krueger | 83/319 |
| 3,502,127 A | * | 3/1970 | Nathanson et al. | 83/257 |
| 3,512,437 A | * | 5/1970 | Enneper et al. | 83/174.1 |
| 3,516,650 A | * | 6/1970 | Komma et al. | 266/50 |
| 4,054,070 A | * | 10/1977 | Steiling | 83/208 |
| 4,111,085 A | * | 9/1978 | Johnson | 83/871 |
| 4,420,118 A | * | 12/1983 | Gehlen | 241/101.2 |
| 4,464,961 A | * | 8/1984 | Tole et al. | 83/346 |
| 5,181,445 A | * | 1/1993 | Cothrell | 83/155 |
| 6,523,444 B2 | | 2/2003 | Keller | 83/13 |

FOREIGN PATENT DOCUMENTS

| | | |
|---|---|---|
| DE | 539 365 | 11/1931 |
| DE | 17 81 187 | 9/1970 |
| DE | 66 06 703 | 11/1970 |
| FR | 1 415 123 | 12/1964 |

* cited by examiner

*Primary Examiner*—Boyer D. Ashley
(74) *Attorney, Agent, or Firm*—Gudrun E. Huckett

(57) ABSTRACT

A sawing device for sheets of wood and plastic material has a support with at least one transport belt. The transport belt has longitudinal profiled sections arranged in the transport direction of the transport belt. The longitudinal profiled sections are positioned at a spacing from one another. At least one saw unit is provided and is moveable transversely to a longitudinal extension of a sheet to be cut while the sheet is resting on the longitudinal profiled sections.

11 Claims, 4 Drawing Sheets

SAWING DEVICE FOR SHEETS OF WOOD, PLASTIC OR THE LIKE

BACKGROUND OF THE INVENTION

1. Field of the Invention

The invention relates to a sawing device for sheets of wood, plastic material or the like, comprising at least one saw unit which is movable transversely to a sheet positioned on a support.

2. Description of the Related Art

It is known to position sawing devices downstream of installations in which sheets are manufactured from individual lamella-shaped pieces of wood, wherein the sawing devices cut the sheets to the desired dimensions. The sheets produced in the installation are moved after a pressing step onto the support which is comprised of several, spaced-apart chains and pivotable support members on which the sheet rests during the sawing step. Such a support is expensive. Moreover, the arrangement of the pivotable support members on the chains requires that the position of the chains must be position-adjusted to match the different lengths of the sheets. Accordingly, it is frequently required to provide many such chains or their position must be newly determined for each installation.

SUMMARY OF THE INVENTION

It is an object of the present invention to configure the sawing device of the aforementioned kind such that the sheets can be cut or sawed simply and inexpensively.

In accordance with the present invention, this is achieved in that the support has at least one transport belt on which longitudinal profiled sections extending in the transport direction of the transport belt are arranged at a distance from one another.

In the sawing device according to the invention, the support comprises a transport belt on which longitudinal profiled sections are arranged. The transport belt is a cost-beneficial component which is favorable in regard to the costs for the sawing device. Since the longitudinal profiled sections extend in the longitudinal direction of the transport belt, their position is ideally arranged for any length of sheets to be cut or can be very simply adjusted for each new installation without constructive expenditure.

DESCRIPTION OF THE PREFERRED EMBODIMENTS

Figure 1:
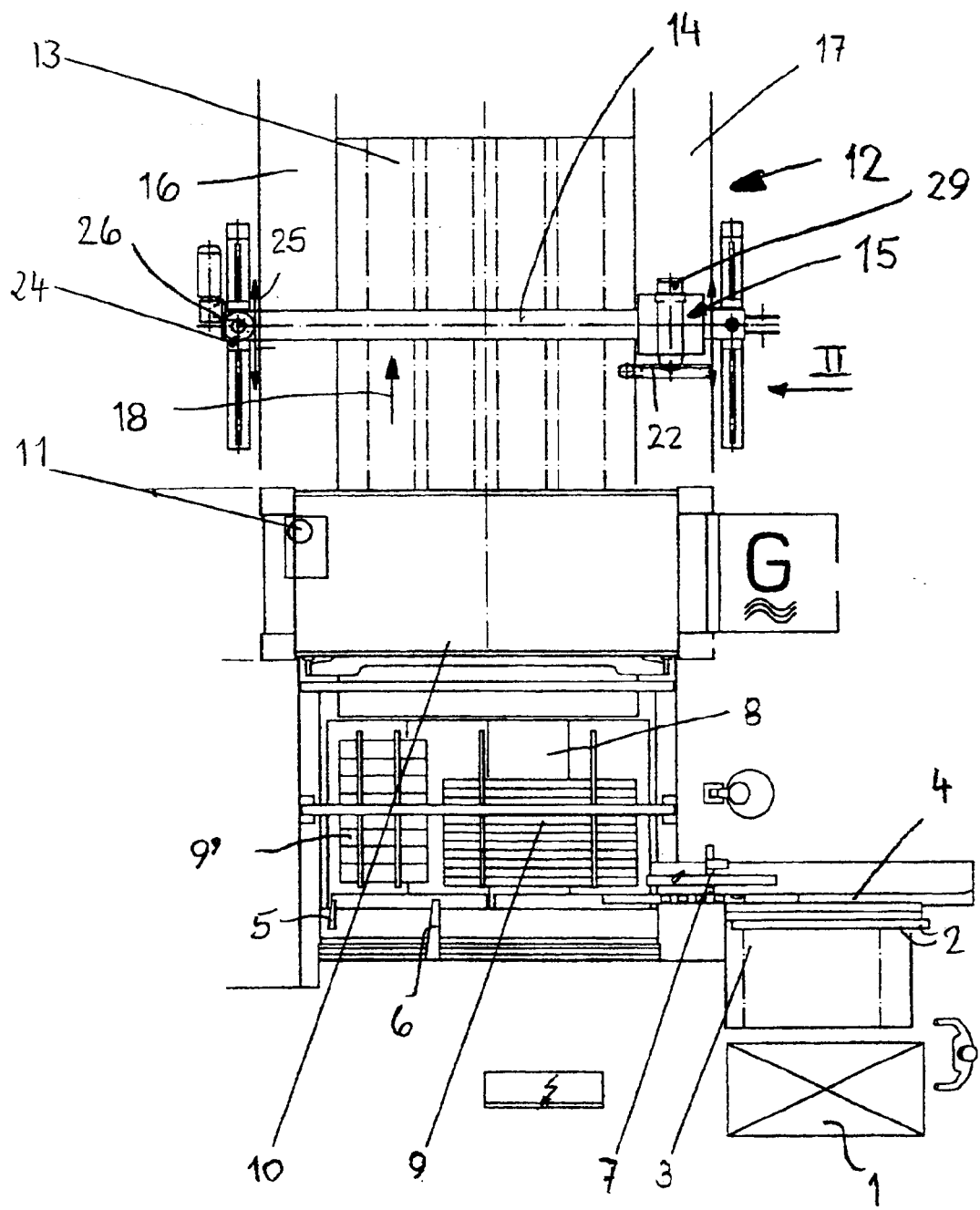
FIG. 1 is a plan view onto a sawing device according to the invention which is arranged downstream of a sheet bonding machine.

The sawing device according to the invention serves for sawing sheets manufactured by a sheet bonding machine from individual pieces of wood.

An operator takes lamella-shaped pieces of wood 2 from a storage device or magazine 1 and positions them on a transverse transporter 3 which transports the pieces of wood 2 transversely to their longitudinal direction against a stop 4. At the stop 4 the pieces of wood are transferred onto a transport device which transports the pieces of wood 2 sequentially in their longitudinal direction to a stop 5 or 6. During this transport, an adhesive is applied onto one longitudinal side of the pieces of wood by means of a glue applicator 7. As soon as the pieces of wood reach the stop 5 and 6, respectively, the pieces of wood are moved by a slide transversely to the longitudinal direction onto a transverse conveyor 8 on which the pieces of wood are compiled to a lamellar package 9 by contacting one another with their longitudinal sides, as is known in the art. In the illustrated embodiment, the lamellar packages 9 and 9' can have different width. When the package 9' is to be produced with shorter pieces of wood, the stop 6 is moved out of the transport path of the pieces of wood 2 so that they are transported up to the stop 5 in the longitudinal direction and are moved by the transverse slide onto the transverse conveyor 8. As is known in the art, the next piece of wood 2 is pushed with its longitudinal side, provided with the glue application, against the package 9' which is already positioned on the transverse conveyor 8.

When the wider package 9 is to be produced, the stop 6 is moved into the transport path of the pieces of wood 2 so that they are transported up to this stop 6 in their longitudinal direction and are then moved by the transverse slide onto the transverse conveyor 8.

In the described way, the packages 9, 9' are compiled on the transverse conveyor 8. Upon pushing the next piece of wood 2 against the already existing package 9, 9', a counter pressure is generated, as is known in the art, so that the individual pieces of wood of the package 9, 9' are firmly pressed together.

As soon as the package 9, 9' has reached the desired length, it is moved into a press 10 which is actuated by a hydraulic device 11. As soon as the respective package 9, 9' has been moved into the press 10, the corresponding pressing plunger is moved downwardly by means of the hydraulic device 11 and the package contained in the press 10 is pressed. In order for the glue between the pieces of wood to dry quickly, heat is employed during this pressing process.

It is possible to simultaneously press packages 9, 9' in the press 10. As soon as the packages 9, 9' have been pressed sufficiently, they are released and the new package 9, 9', which has been compiled on the transverse conveyor 8 during the pressing step, is now moved into the press 10. When doing so, the pressed and dried package 9, 9' which has already been pressed and dried in the press 10, is moved by the next package still to be pressed into the sawing device 10. In the sawing device 12 the packages 9, 9' are sawed transversely to their longitudinal direction into individual pieces. The sawing device 12 has a transport unit 13 onto which the package 9, 9' is moved after the pressing process. With the transport unit 13 the packages 9, 9' which are to be cut are transported transversely to the longitudinal direction of the glued pieces of wood 2.

Figure 2:
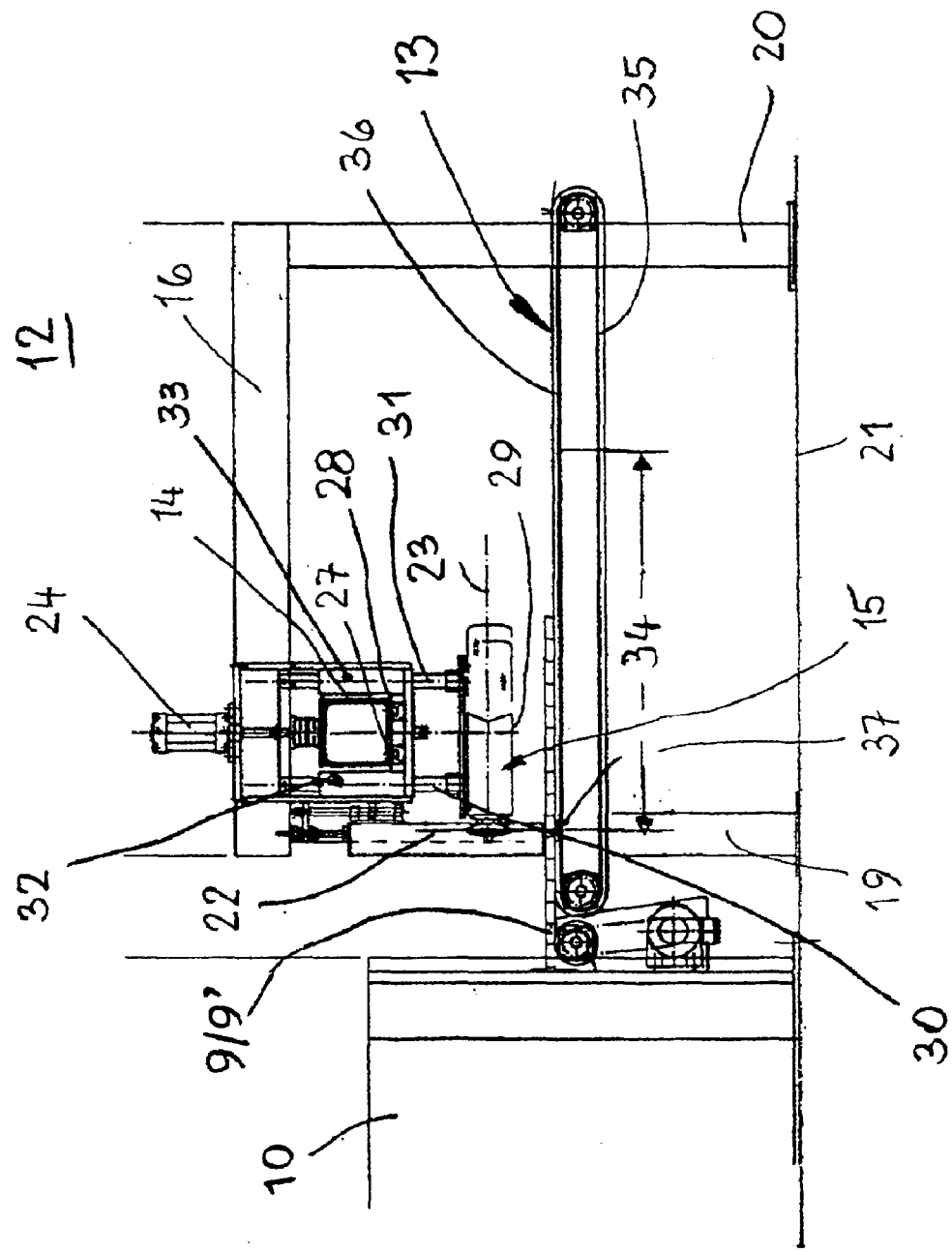
FIG. 2 is a view in the direction of arrow II of FIG. 1.
Figure 3:
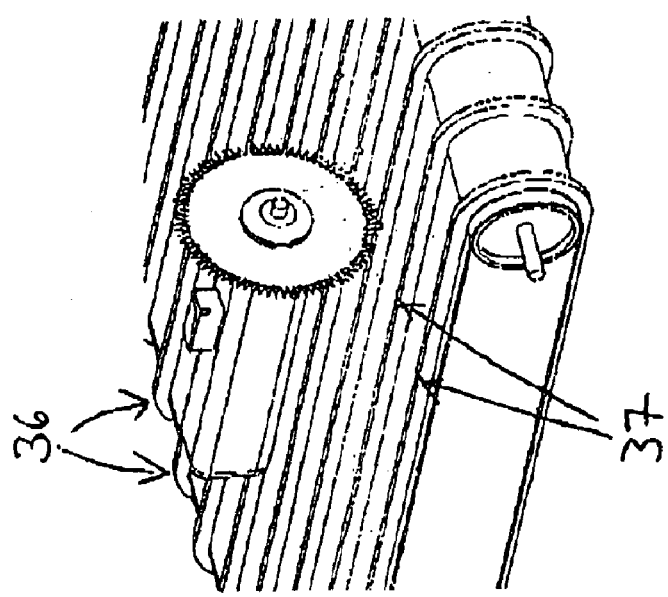
FIG. 3 is a perspective detail view of the longitudinal profiled sections of the transport belt provided with a recess for accommodating the circular saw blade.
Figure 4:
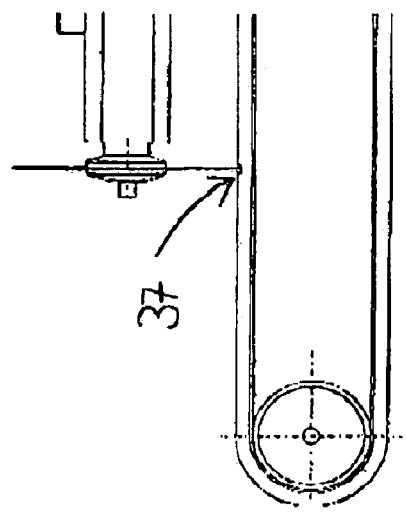
FIG. 4 shows the circular saw blade positioned in a recess of the longitudinal profiled section.

The sawing device 12 has a transverse support 14 along which a saw unit 15 is movable. The transverse support 14 is moveably supported with its two ends on the longitudinal support beams 16, 17, respectively. The longitudinal beams 16, 17 extend in the transport direction 18 of the transport unit 13. As illustrated in FIG. 2, the longitudinal beams 16, 17 are supported with their ends on vertical supports 19, 20 which are resting on the floor 21. The saw unit 15 has a circular saw blade 22 which is driven in rotation about a horizontal axis 23 .

For driving the transverse support 14 along the longitudinal beams 16, 17, drive motors 24 are provided which, as is known in the art, move the transverse support 14 with the saw unit 15 suspended therefrom parallel to the transport direction 18 in the direction of the double arrows 25 illustrated in the drawing (FIG. 1). For moving the saw unit 15 perpendicularly to the moving direction 25 along the transverse support 14, a stationary electric motor 26 (FIG. 1) is provided with which the saw unit 15 in the illustrated embodiment is driven by means of a chain drive. At the underside of the transverse support 14 two adjacently positioned linear guides 27, 28 are provided which extend in the longitudinal direction of the transverse support 14 and from which the saw unit 15 is suspended.

The saw unit 15 has a horizontally positioned motor 29 with which the saw blade 22 is driven. The saw motor 29 is suspended from parallel piston rods 30, 31 positioned at a spacing to one another which project from vertical cylinder housings 32, 33 in the downward direction. They are arranged in the area adjacent to the transverse support 14 within the saw unit 15. By means of the piston rods 30, 31 the saw motor 29 is pneumatically lowered into the cutting position. The maximum travel stroke of the saw unit 15 along the longitudinal beams 16, 17 is illustrated in FIG. 2 at 34. Since the saw motor 29 can be lowered into the cutting position, it is also possible to saw sheets of different width in a multi-track process.

The transport unit 13 downstream of the press 10 is adjusted to the length and the width of the sheet-shaped package 9, 9' which is pushed out of the press. The transport unit 13 has a transport belt 35 which in the shown embodiment has a width of 2,500 mm and a length between approximately 2,000 and 3,000 mm. Of course, the transport belt 35 can also have other dimensions depending on the dimensions of the packages 9, 9' to be sawed. It is also possible to provide two or more transport belts adjacent to one another and/or behind one another. The transport belt 35 is closed and has at its upper side strip-shaped profiled members 36 which extend across the entire length of the transport belt 35 and are welded or glued onto the transport belt 35. Preferably, they are made of the same material as the transport belt 35. Depending on the width of the transport belt 35 several such longitudinal profiled sections or members 36 are provided. In the shown embodiment, the longitudinal profiled sections 36 are provided at a spacing of approximately 100 to 150 mm and have, for example, a height of approximately 8 mm. The longitudinal profiled sections 36 extend over the entire circumference of the transport belt 35 in the transport direction 18. The package 9, 9' rests during the sawing process on these longitudinal profiled sections.

In order for the saw blade 22 not to destroy the longitudinal profiled sections 36 during the sawing process, the sections 36 are provided with at least one recess 37 through which the circular saw blade 22 can move during the sawing process. Of course, the recesses 37 of adjacent, spaced apart longitudinal profiled sections 36 are positioned at the same level. The width of the recesses 37 is, for example, 50 mm so that there is sufficient play for the circular saw blade 22.

It is possible that the longitudinal profiled sections 36 have several recesses 37 positioned at a spacing from one another. These recesses 37 in all embodiments are advantageously of such a depth that they extend down to and meet the transport belt 35.

The saw motor 29 with the circular saw blade 22 is in a lifted position when the package 9, 9' is inserted into the sawing device so that the package 9, 9' can be moved reliably onto the longitudinal profiled sections 36 of the transport belt 35. The package 9, 9' is moved onto the transport belt 35 by the new package moving into the press 10. The package 9, 9' moved into the press 10 and not yet pressed aligns the package being pushed out on the transport belt 35 so that the subsequent sawing cut can be performed without problems.

The transverse support 14 with the saw unit 15 is moved along the longitudinal beams 16,17 into the required position. Advantageously, for driving the transverse support 14 a motor 24 is provided on its two ends, respectively, so that the transverse support 14 can be moved properly in the travel direction 25. The transverse support 14 is moved into the position required for transversely sawing the package 9, 9'. During this movement, the circular saw blade 22 is spaced from the package 9, 9'. Advantageously, the saw unit 15 is positioned at one end of the transverse support 14. When the vertical supports 19, 20 have a corresponding spacing from the longitudinal edges of the transport belt 35, the saw unit 15 is substantially in the area adjacent to the package 9, 9'.

As soon as the circular saw blade 22 has reached the position required for the sawing cut, the saw motor 29 is lowered into the cutting position. The circular saw blade 22 is then positioned at the level of the recesses 37 of the longitudinal profiled sections 36 on the transport belt 35, which has been moved before insertion of the package 9, 9' within the sawing device 12 such that the recesses 35 are positioned at the level of the circular saw blade 22. When the longitudinal profiled sections 36 are provided with only one recess 37, the transport belt 35 moves one revolution until the recesses 37 are in the cutting position. After lowering the saw motor 29 into the cutting position, the saw unit 15 is moved along the transverse support 14 and the rotating saw blade 22 saws the package 9, 9' by the required amount.

After completion of the sawing process, the transport belt 35 is driven such that the sawed-off sheet portion is transported away in the transport direction 18.

As soon as the saw unit 15 with the transverse support 14 has been moved into a new cutting position, the transport belt 35 subsequently completes the remaining revolution until the recesses 37 are in the new cutting position.

When the longitudinal profiled sections 36 have several recesses, then it is not required to perform a complete revolution of the transport belt 35. The belt 35 must be moved only into a position in which one of the recesses 37 of the longitudinal profiled sections 36 is positioned in the cutting position. The next cutting process can then be performed by moving the saw unit 15 along the transverse support 14.

Since the recesses 37 of the longitudinal profiled sections 36 are always in the correct position during the cutting process, the longitudinal profiled sections 36 are not damaged by the circular saw blade 22 and therefore must also not be exchanged, as was required in the past for stationary devices.

Since the transport belt 35 has a closed support surface, cuttings will not drop down; they can be removed instead by suction from the transport belt 35. If residual pieces should remain on the transport belt 35, they are transported downwardly at the deflection location and can be collected there.

The longitudinal profiled sections 36 of the transport belt 35 advantageously have a minimal spacing from one another so that even short or narrow packages 9, 9' rest in any position safely thereon and can be reliably transported.

The transport belt 35 is economical with regard to initial installation and ensures for any package length an optimal support action. The transverse support 14 is advantageously driven on both ends by drives which are preferably servo drives. The two drives are controllable independent from one another and connected to a control (not illustrated). It is ensured by means of the control that the drives move synchronously so that the transverse support 14 is aligned properly at a right angle to the longitudinal direction of the packages 9, 9'. This ensures that the wood packages 9, 9' are cut precisely at a right angle. The cutting angle can advantageously be manually corrected if an error with regard to parallel alignment relative to the bonding seam should occur.

The transverse support 14 is connected at its ends with the longitudinal beams 16, 17 such that it can be adjusted by small angles at a slant to the transport direction 18, for example, within an angular range of ±7°. Accordingly, the package 9, 9' can be sawed with slantedly positioned sides so that these sawed sheet pieces, for example, can be used for the manufacture of coffins where pieces of wood with slanted longitudinal edges are required.

While specific embodiments of the invention have been shown and described in detail to illustrate the inventive principles, it will be understood that the invention may be embodied otherwise without departing from such principles.

What is claimed is:

1. A sawing device for sheets of wood and plastic material, comprising:

a support comprising at least one transport belt having longitudinal profiled sections extending lengthwise in a transport direction of the transport belt;

wherein the longitudinal profiled sections are spaced from one another in a direction transverse to the transport direction and project outwardly from the at least one transport belt so that a sheet transported on the at least one transport belt rests on top of the longitudinal profiled sections;

at least one saw unit having a saw blade and configured to move transversely to the transport direction and to a longitudinal extension of a sheet to be cut while the sheet is resting on the longitudinal profiled sections;

wherein the longitudinal profiled sections each have at least one recess, respectively, wherein the at least one recesses extend transversely to the transport direction and are aligned with one another transversely to the transport direction, and wherein the at least one recesses are moved into alignment with the saw blade of the at least one saw unit so that the saw blade moves through the at least one recesses during sawing of the sheet.

2. The sawing device according to claim 1, wherein the longitudinal profiled sections extend circumferentially about an entire length of the transport belt.

3. The sawing device according to claim 1, wherein the transport belt has a closed surface.

4. The sawing device according to claim 1, wherein the saw unit has a saw motor which is configured to be lowered into a cutting position.

5. The sawing device according to claim 1, comprising a transverse support extending transversely across the transport belt, wherein the saw unit is configured to be movable along the transverse support.

6. The sawing device according to claim 5, wherein the transverse support is moveable in the transport direction of the transport belt.

7. The sawing device according to claim 5, further comprising longitudinal beams extending in the transport direction on opposite sides of the transport belt, wherein the transverse support has opposed ends and wherein the opposed ends are moveably supported on the longitudinal beams.

8. The sawing device according to claim 7, wherein the transverse support has a longitudinal axis and is adjustable transversely to the longitudinal axis relative to the longitudinal beams for adjusting a slanted cutting angle of the saw unit.

9. The sawing device according to claim 7, wherein the transverse support comprises motors for moving the transverse support on the longitudinal beams, wherein each one of the opposed ends is provided with one of the motors.

10. The sawing device according to claim 9, wherein the motors are actuatable independently from one another and are configured to be connected to a common control.

11. The sawing device according to claim 9, wherein the motors are servo motors.

* * * * *